United States Patent [19]
Planeta et al.

[11] Patent Number: 6,116,885
[45] Date of Patent: Sep. 12, 2000

[54] EXTRUSION OF PLASTIC MATERIALS IN MULTILAYER TUBULAR FILM

[75] Inventors: Mirek Planeta; Surendra M. Sagar, both of Mississauga, Canada

[73] Assignee: Macro Engineering & Technology Inc., Mississauga, Canada

[21] Appl. No.: 09/082,477

[22] Filed: May 21, 1998

Related U.S. Application Data

[63] Continuation-in-part of application No. 08/822,628, Mar. 21, 1997, Pat. No. 5,788,902.

[51] Int. Cl.⁷ .................................................. B29C 47/06
[52] U.S. Cl. ...................... 425/133.1; 425/380; 425/462; 425/467
[58] Field of Search ................................ 425/133.1, 380, 425/381, 462, 461, 466, 467; 264/171.27, 171.29, 173.13, 209.8

[56] References Cited

U.S. PATENT DOCUMENTS 5,788,902   8/1998   Planeta ................................ 425/133.1

*Primary Examiner*—Harold Pyon
*Assistant Examiner*—Joseph Leyson
*Attorney, Agent, or Firm*—Robert F. Delbridge

[57] ABSTRACT

An apparatus for extruding plastic materials in multilayer tubular form includes an annular extrusion die having an annular extrusion orifice and annular passage for conveying plastic material to the extrusion orifice, the die also having at least one arcuate passage extending at least partly around the annular passage such that the arcuate passage completely surrounds, or where there is more than one arcuate passage in combination completely surround, the annular passage inwardly or outwardly thereof and is or are in communication therewith. A melt stream of plastic material is encapsulated with a different plastic material in a circumferentially continuous manner to produce an encapsulated melt stream, and at least a portion of the encapsulated melt stream is fed to an arcuate passage to cause at least partially encapsulated plastic material to pass into the annular passage with subsequent extrusion in multilayer tubular form from the annular die orifice.

2 Claims, 11 Drawing Sheets

EXTRUSION OF PLASTIC MATERIALS IN MULTILAYER TUBULAR FILM

This application is a continuation-in-part of application Ser. No. 08/822,628 filed Mar. 21, 1997 now U.S. Pat. No. 5,788,902 issued Aug. 4, 1998.

FIELD OF INVENTION

This invention relates to the extrusion of plastic materials in multilayer tubular film. Although the invention is especially useful when one of the plastic materials is readily degradable, the invention is not limited to the use of a degradable plastic material. The invention may be used to produce multilayer tubular film in which the layers are of any suitable compatible plastic materials to enable such film to be produced in a more economical manner than before.

BACKGROUND OF INVENTION

It is well known that it is difficult to extrude some plastic materials, such as PVDC, because of their susceptibility to degradation during extrusion as a result of contact with the walls of the extrusion die. Attempts have been made to overcome this problem by encapsulating the degradable plastic material with non-degradable plastic material prior to extrusion. Such encapsulation was originally carried out when extruding plastic material in sheet form, but subsequent attempts have also been made to encapsulate plastic material during extrusion in tubular form from annular extrusion dies.

Initial attempts to carry out encapsulation with annular extrusion dies have utilized the same general principle which was used with extrusion dies for sheet material, namely in which a melt stream of degradable plastic material encapsulated with non-degradable plastic material was divided into two streams and fed around the annular extrusion die in opposite directions and then re-joined on an opposite side of the die. Annular extrusion dies of these kind have been known as crosshead or side feed dies, a typical example being shown in U.S. Pat. No. 5,143,677 (Blemberg et al). However, problems arise where the divided melt streams are re-joined. Attempts have been made to overcome this problem but have not been particularly successful because this method always produces problems in the area where the divided melt streams have been rejoined.

It is therefore an object of the present invention to provide a method of extruding degradable plastic material in tubular form which substantially overcomes the problem mentioned above. However, as mentioned above, the invention is not limited to the use of degradable plastic material and can be used to produce multilayer film with a single die.

SUMMARY OF INVENTION

According to the present invention, a method of extruding plastic materials in multilayer tubular film includes providing an annular extrusion die having an annular extrusion orifice and an annular passage for conveying plastic material to the extrusion orifice, the die also having at least one arcuate passage extending at least partly around the annular passage such that the arcuate passage completely surrounds, or where there is more than one arcuate passage in combination completely surround, the annular passage inwardly or outwardly thereof and is or are in communication therewith. A melt stream of plastic material is encapsulated with a different plastic material in a circumferentially continuous manner to produce a separate encapsulated melt stream. At least a portion of the encapsulated melt stream is fed to an arcuate passage to cause at least partially encapsulated plastic material to pass into the annular passage with subsequent extrusion in multilayer tubular form from the annular die orifice.

The annular extrusion die may have an inner body member surrounded by an annular outer body member forming the longitudinally extending annular passage therebetween, with the inner body member having two arcuate passages formed by two helical grooves in the inner body member. The two helical grooves may commence at diametrically opposite positions in the inner body member and extend around the inner body member in the same direction.

Each helical groove may extend around the inner body member for just over 180° so as to form a three layer tubular film. Alternatively, each helical groove may extend around the inner body member for just over 360° so as to form a five layer tubular film, and the longitudinally extending annular passage may be wider beyond the 180° position of the helical grooves than before the 180° position. In another alternative, each helical groove may extend around the inner body member for just over 540° so as to form a seven layer tubular film.

At least one of the melt streams may be degradable plastic material, the associated encapsulating plastic material being a non-degradable plastic material. Thus, after encapsulation, none of the degradable plastic material contacts a die surface.

The degradable plastic material may be a vapour barrier material. The vapour barrier material may be relatively rigid and the non-degradable plastic material encapsulating the vapour barrier material may be relatively elastic.

The present invention also provides an annular extrusion die for extruding plastic materials in multilayer tubular film, the extrusion die having an inner body member and an outer body member surrounding the inner body member and forming an annular passage therebetween which communicates with an annular extrusion orifice. The inner body member has at least one helical groove for passing plastic material into the annular passage for subsequent extrusion in tubular form from the annular extrusion orifice. The die also has a supply passage for supplying a first plastic material to the helical groove or grooves, and an encapsulating unit for encapsulating the first plastic material with a second plastic material in a circumferentially continuous manner before the first plastic material enters the helical groove or grooves whereby the first plastic material entering a helical groove is at least partially encapsulated by the second plastic material.

The inner body member may have two helical grooves extending around the inner body member in the same direction, with the die also having two encapsulating units, one of the encapsulating units operating to encapsulate a stream of plastic material with a different plastic material before it enters one of the helical grooves, and the other encapsulating unit operating to encapsulate a further stream of plastic material with a different plastic material before it enters the other helical groove.

DESCRIPTION OF THE DRAWINGS

Embodiments of the invention will now be described, by way of example, with reference to the accompanying drawing, of which.

DESCRIPTION OF PREFERRED EMBODIMENTS

Figure 1:
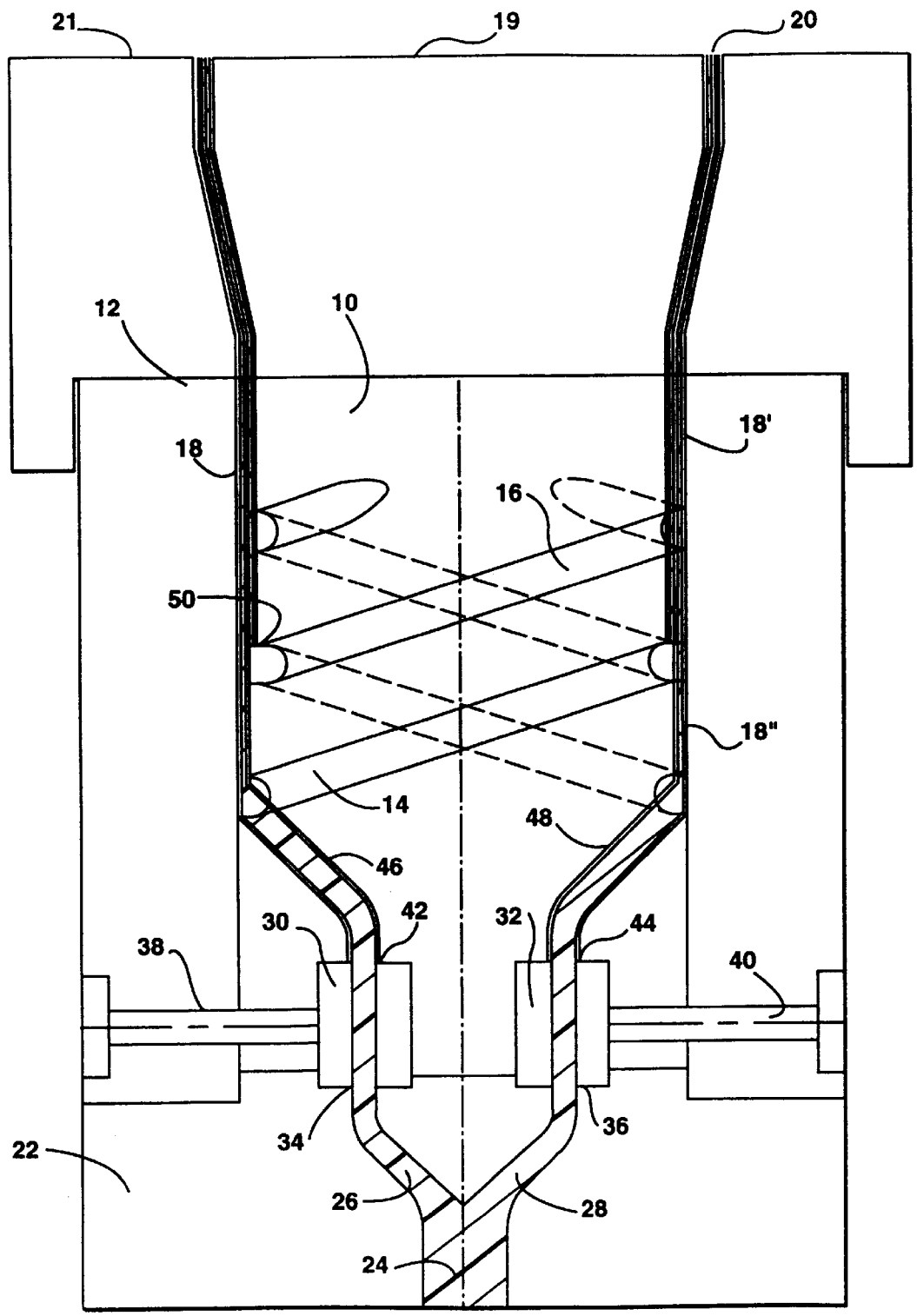
FIG. 1 is a cross-sectional view of an annular extrusion die in accordance with one embodiment.

Referring to the drawings, FIG. 1 shows an annular extrusion die with an inner die body member 10 and an outer annular die body member 12 surrounding the inner die body member 10. The outer surface of the inner body member 10 has two helical grooves 14, 16 which commence at diametrically opposite positions in a lower portion of the inner body member 10 and extend upwardly in a helical manner in the same direction around the inner die body member 10 for just over 360°. The inner and outer die body members 10, 12 form a longitudinally extending annular passage 18 with which the grooves 12, 14 are in communication and which leads to an annular extrusion orifice 20. The extrusion orifice 20 is actually formed by inner and outer lip members 19, 21 mounted on top of the inner and outer die body members 10, 12 in known manner.

The inner and outer body members 10, 12 are mounted on a base member 22 which has a main feed passage 24 for degradable plastic material extending upwardly from the bottom thereof. Within the body member 22, the main passage 24 divides into two feed passages 26, 28. Two encapsulating units 30, 32 are located between the inner body member 10 and the base member 22 and have inlets 34, 36 communicating with the feed passages 26, 28 respectively. Each encapsulating unit 30, 32 encapsulates degradable plastic material passing therethrough from the feed passages 26, 28 respectively in a circumferentially continuous manner with non-degradable plastic material supplied to the encapsulating units 30, 32 through passages 38, 40 respectively, the passages 38, 40 each being partly in the outer body member 12 and partly in the inner body member 10.

Each encapsulating unit 30, 32 has an outlet 42, 44 respectively which feed an encapsulated stream of plastic material, i.e. a stream of degradable plastic material encapsulated in a circumferentially continuous manner with a non-degradable plastic material, to the lower ends of the helical grooves 14, 16 respectively through feed passages 46, 48 respectively in the inner body members 10.

It will be noted that, at the position 50 where each helical groove 14, 16 has traversed 180° from its lower starting position, the diameter of the inner body portion 10 is reduced so that the width of the annular passage 18' above the position 50 is somewhat greater than the width of the annular passage 18" below the position 50.

In use, a melt stream of degradable plastic material, which may be vapour barrier material, such as PVDC or EVOH, is passed into the main feed passage 24 and then divided into two streams which pass through passages 26, 28 to the encapsulating units 30, 32 where the divided streams are completely encapsulated around their circumferences with non-degradable plastic material, such as EVA. The encapsulated streams then pass through passages 46, 28 into the helical grooves 14, 16. Until the 180° position of the helical grooves 14, 16, the encapsulated material passes into the lower narrower portion 18" of the annular passage 18 to form a three layer tubular film of plastic material, i.e. a tubular film with an inner layer of degradable plastic material and inner and outer layers of non-degradable plastic material. Beyond the 180° position 50, encapsulated plastic material passes from the helical grooves 14, 16 into the wider portion 18' of the annular passage 18 to form further layers on the inside of the previously formed tubular film. The resultant five layer tubular film is then extruded from the annular die orifice 20.

As shown in the drawing, the helical grooves 14, 16 extend around the inner die body member 10 in the same direction for slightly more than 360°. The resultant tubular film has a central relatively thick layer of non-degradable plastic material, a layer of degradable plastic material on the inner and outer sides thereof, and innermost and outermost layers of non-degradable plastic material. Thus, when the degradable plastic material is vapour barrier material, the tubular film is provided with two vapour barrier layers. The presence of two vapour barrier layers minimizes the possibility of irregularities or pinholes in the barrier layers causing a problem, because irregularities or pinholes in one barrier layer are unlikely to be radially aligned with irregularities or pinholes in the other barrier layer. Further, in this case, each vapour barrier layer can be relatively thin, for example below 10 microns, to reduce the possibility of the barrier layer cracking, as happens with some plastic materials (for example highly crystalline plastic material) when the barrier layer is thicker. Also, when the degradable plastic material is relatively rigid and the non-degradable plastic material is relatively elastic, the alternating layers of rigid and elastic plastic material provide a tubular film of high impact strength.

It will be understood that the helical grooves 14, 16 may extend around the inner die body member 10 in the same direction for just over 180° so as to form as three layer tubular film. Alternatively, the helical grooves 14, 16 may extend around the inner body member 10 for just over 540° to produce a seven layer tubular film. Also, the degradable plastic material entering the passage 24 may be circumferentially encapsulated with non-degradable plastic material as primary encapsulation, with the encapsulating units 30, 32 thus providing secondary encapsulation.

Figure 2:
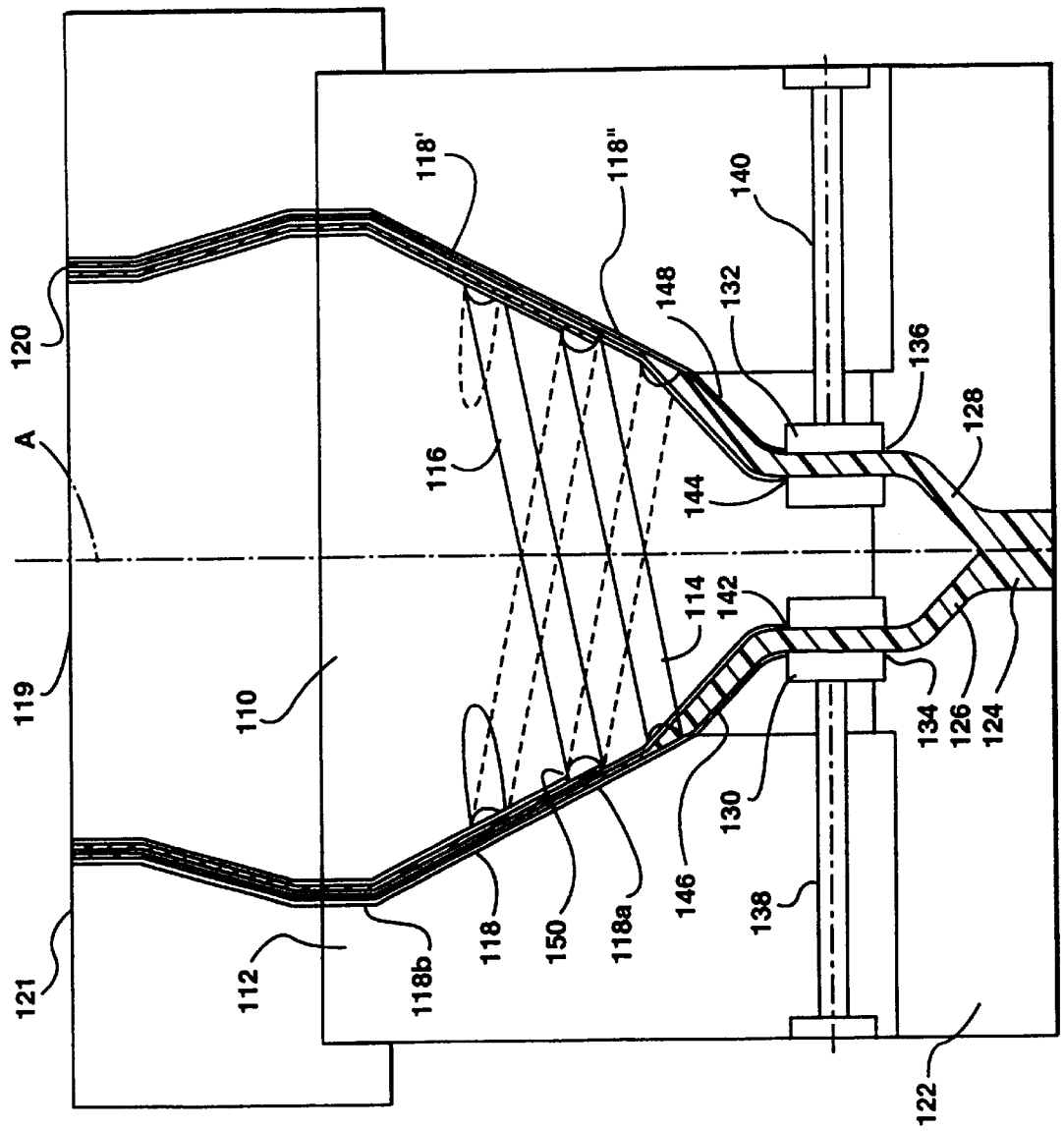
FIG. 2 is a similar view of another embodiment.

FIG. 2 shows another embodiment of the invention. For ease of understanding, parts of the die shown in FIG. 2 will be given reference numerals which are 100 higher than the reference numerals given to similar parts of the die shown in FIG. 1.

FIG. 2 shows an annular extrusion die with an inner die body member 110 and an outer annular die body member 112 surrounding the inner die body member 110. The outer surface of the inner body member 110 has two helical grooves 114, 116 which commence at diametrically opposite positions in a lower portion of the inner body member 10 and extend upwardly in a helical manner in the same direction around the inner die body member 110 for just over 360°. The inner and outer die body members 110, 112 form a longitudinally extending annular passage 118 with which the grooves 114, 116, are in communication and which leads to an annular extrusion orifice 120. The extrusion orifice 120 is actually formed by inner and outer lip members 119, 121 mounted on top of the inner and outer die body members 110, 112 in known manner.

The inner and outer body members 110, 112 are mounted on a base member 122 which has a main feed passage 124 for degradable plastic material extending upwardly from the bottom thereof. Within the body member 122, the main passage 124 divides into two feed passages 126, 128. Two encapsulating units 130, 132 are located between the inner body member 110 and the base member 122 and have inlets 134, 136 communicating with the feed passages 126, 128 respectively. Each encapsulating unit 130, 132 encapsulates degradable plastic material passing therethrough from the feed passages 126, 128 respectively in a circumferentially continuous manner with non-degradable plastic material supplied to the encapsulating units 130, 132 through passages 138, 140 respectively, the passages 138, 140 each being partly in the outer body member 112 and partly in the inner body member 110.

Each encapsulating unit 130, 132 has an outlet 142, 144 respectively which feed an encapsulated stream of plastic material, i.e. a stream of degradable plastic material encapsulated in a circumferentially continuous manner with a non-degradable plastic material, to the lower ends of the helical grooves 114, 116 respectively through feed passages 146, 148 respectively in the inner body members 110.

It will be noted that, at the position 150 where each helical groove 114, 116 has traversed 180° from its lower starting position, the diameter of the inner body portion 110 is reduced so that the width of the annular passage 118' above the position 150 is somewhat greater than the width of the annular passage 118" below the position 150.

The inner surface of the outer body member 112 and the outer surface of the inner body member 110 are shaped in such a manner that the lower portion 118a of the annular passage 118 extends in an upwardly and outwardly inclined direction relative to the longitudinal axis A of the die, and the upper portion 118b of the annular passage 118 extends parallel to the longitudinal axis a of the die. It will be noted that the upper portion 118b of the annular passage 118 is relatively short compared to the lower portion 118a of the annular passage 118.

In use, a melt stream of degradable plastic material, which may be vapour barrier material, such as PVDC or EVOH, is passed into the main feed passage 124 and then divided into two streams which pass through passages 126, 128 to the encapsulating units 130, 132 where the divided streams are completely encapsulated around their circumferences with non-degradable plastic material, such as EVA. The encapsulated streams then pass through passages 146, 148 into the helical grooves 114, 116. Until the 180° position of the helical grooves 114, 116, the encapsulated material passes into the lower narrower portion 118" of the annular passage 118 to form a three layer tubular film of plastic material, i.e. a tubular film with an inner layer of degradable plastic material and outer layers of non-degradable plastic material. Beyond the 180° position 150, encapsulated plastic material passes from the helical grooves 114, 116 into the wider portion 118' of the annular passage 118 to form further layers on the inside of the previously formed tubular film. The resultant five layer tubular film is then extruded from the annular die orifice 120.

As shown in FIG. 2, the helical grooves 14, 16 extend around the inner die body member 10 in the same direction for slightly more than 360°. The resultant tubular film has a central relatively thick layer of non-degradable plastic material, a layer of degradable plastic material on the inner and outer sides thereof, and innermost and outermost layers of non-degradable plastic material. Thus, when the degradable plastic material is vapour barrier material, the tubular film is provided with two vapour barrier layers. The presence of two vapour barrier layers minimizes the possibility of irregularities or pinholes in the barrier layers causing a problem, because irregularities or pinholes in one barrier layer are unlikely to be radially aligned with irregularities or pinholes in the other barrier layer. Further, in this case, each vapour barrier layer can be relatively thin, for example less than 10 microns, to reduce the possibility of the barrier layer cracking, as happens with some plastic materials (for example highly crystalline plastic material) when the barrier layer is thicker. Also, when the degradable plastic material is relatively rigid and the non-degradable plastic material is relatively elastic, the alternating layers of rigid and elastic plastic material provide a tubular film of high impact strength.

It will be understood that the helical grooves 114, 116 may extend around the inner die body member 110 in the same direction for just over 180° so as to form a three layer tubular film. Alternatively, the helical grooves 114, 116 may extend around the inner die body member 110 for just over 540° to produce a seven layer tubular film. Also, the degradable plastic material entering the passage 124 may be circumferentially encapsulated with non-degradable plastic material as primary encapsulation, with the encapsulating units 130, 132 thus providing secondary encapsulation.

Figure 3:
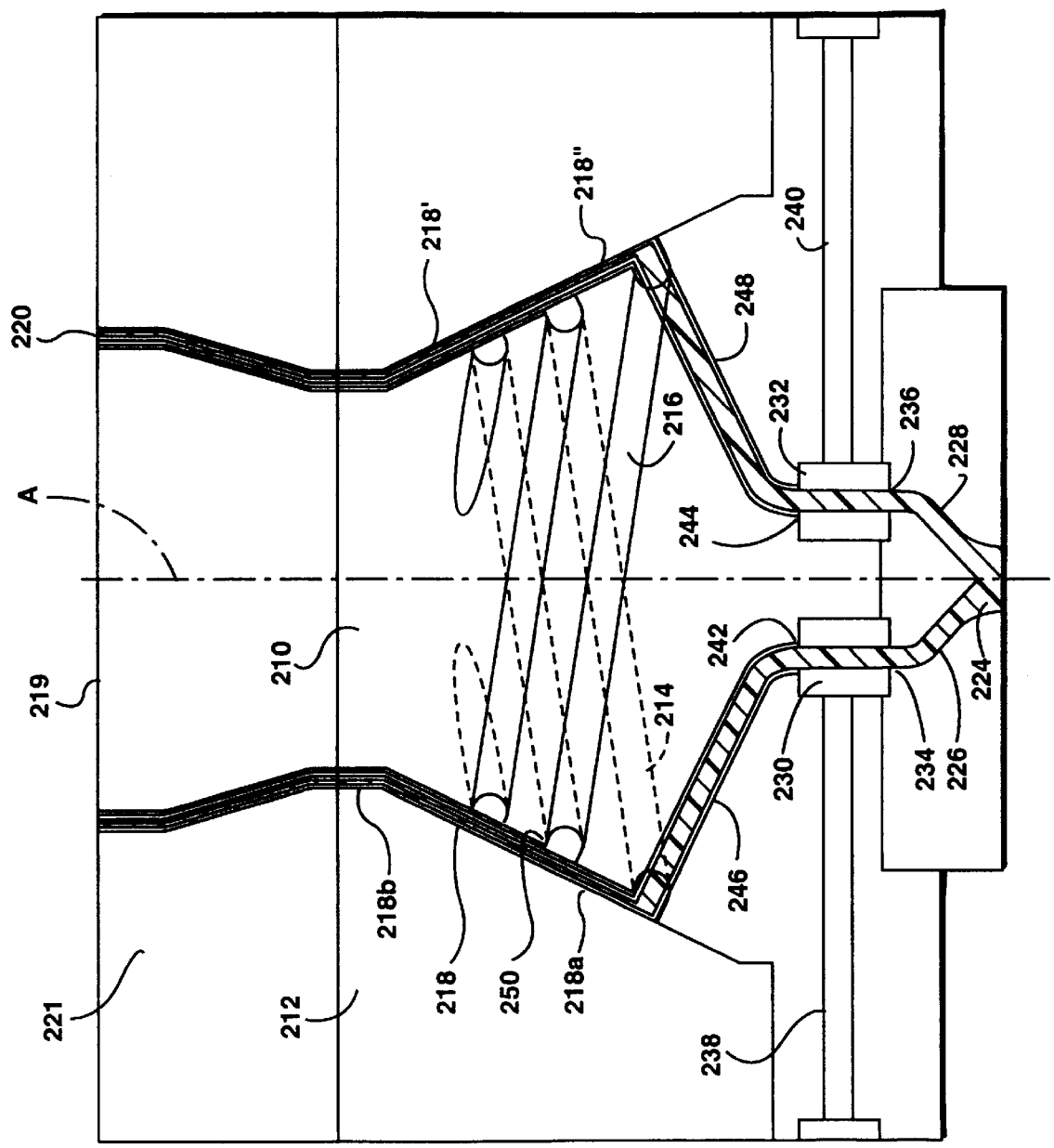
FIG. 3 is a similar view of another embodiment.

FIG. 3 shows another embodiment of the invention. For ease of understanding, parts of the die shown in FIG. 3 will be given reference numerals which are one hundred higher than the reference numerals given to similar parts of the die shown in FIG. 2.

The die shown in FIG. 3 is similar shown in FIG. 2 except that the inner surface of the outer body member 212 and the outer surface of the inner body member 210 are shaped in such a manner that the lower portion 218a of the annular passage 218 extends in an upwardly and inwardly inclined direction relative to the longitudinal axis a of the die and the upper portion 218b of the annular passage 218 extends parallel to the longitudinal axis A. The upper portion 218b of the annular passage 218 is relatively short compared to the lower portion 218a of the annular passage 218.

Figure 5:
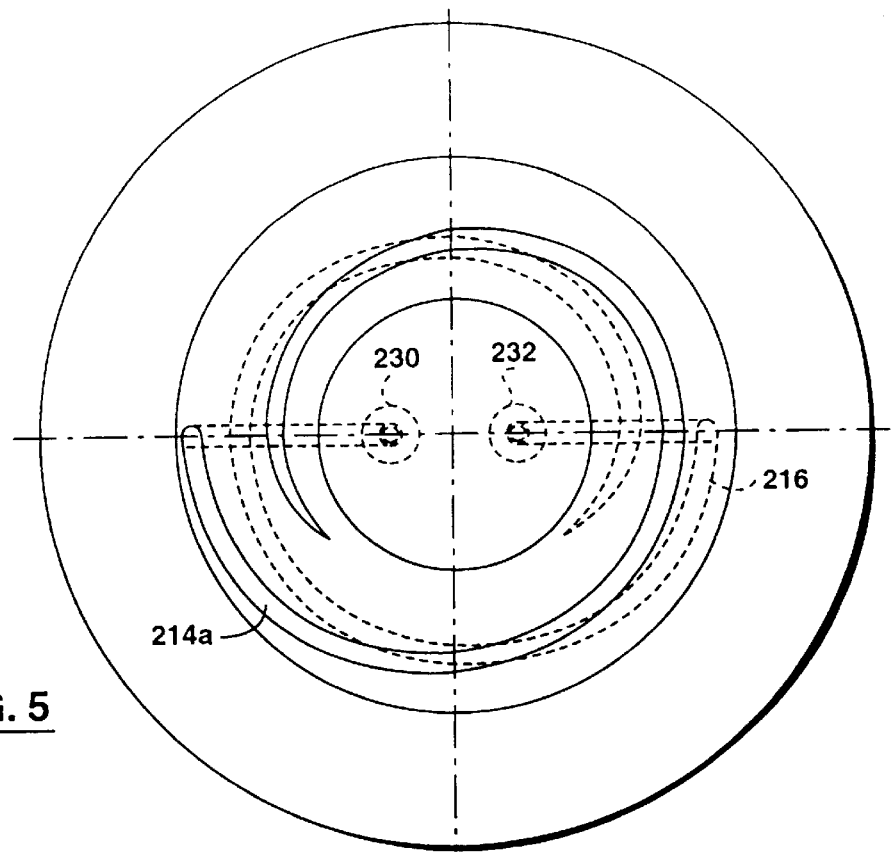
FIG. 5 is a diagrammatic sectional view along the line 5—5 of FIG. 4.
Figure 4:
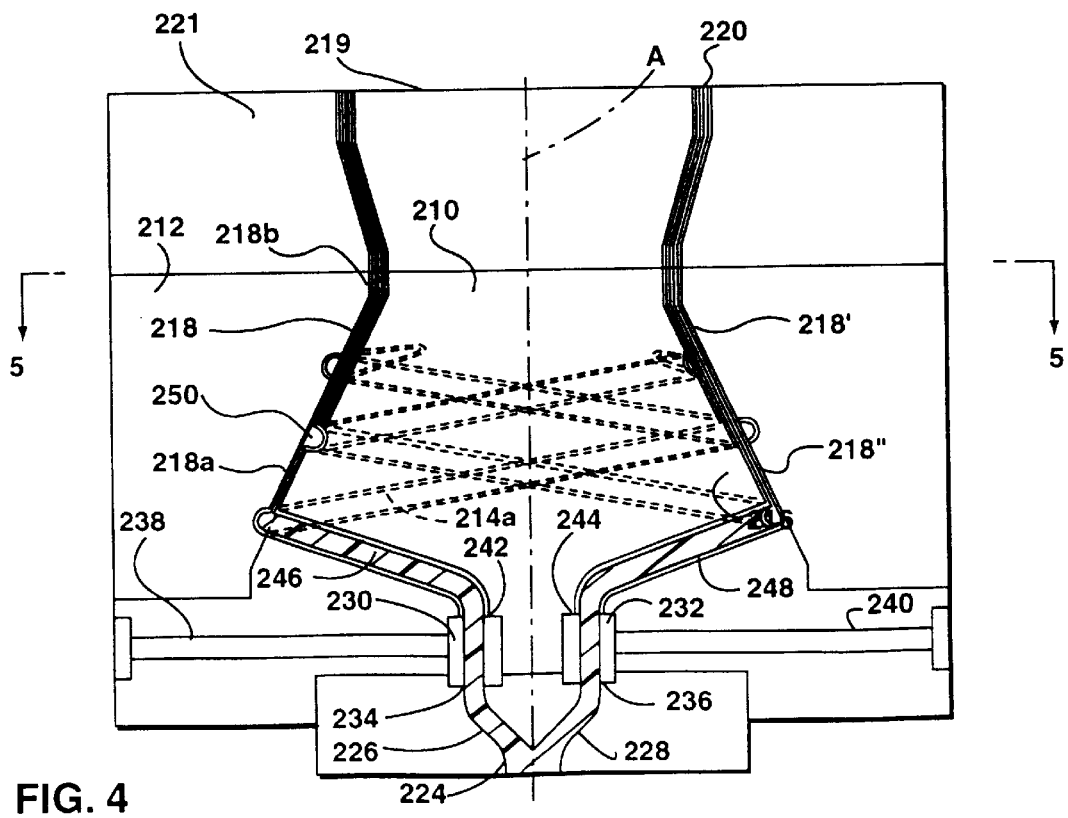
FIG. 4 is a similar view of another embodiment.

FIGS. 4 and 5 show another embodiment of the invention which is somewhat similar to the embodiment shown in FIG. 3. Therefore, the same reference numerals will be used in FIGS. 4 and 5 to identify parts which are the same or similar to parts shown in FIG. 3. It will be noted that, whereas in the embodiment of FIG. 3 the helical groove 214 is in the inner body member 210, the equivalent helical groove 214a in the embodiment of FIGS. 4 and 5 is in the outer body member 212.

Figure 7:
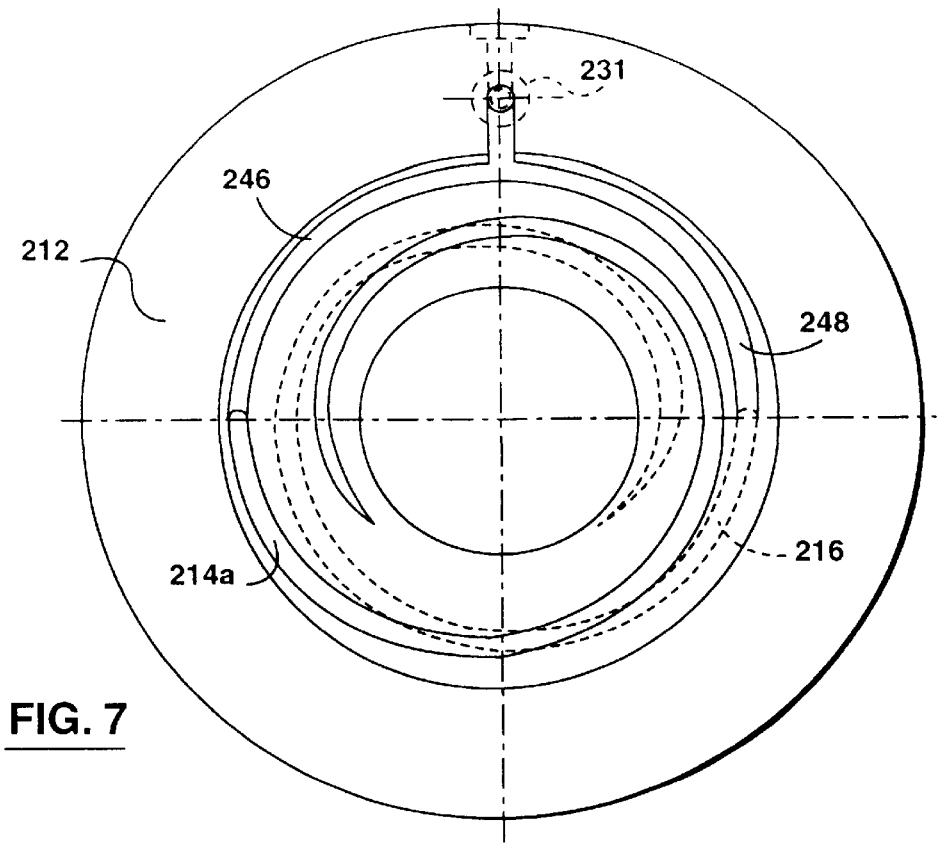
FIG. 7 is a diagrammatic sectional view along the line 7—7 of FIG. 6.
Figure 6:
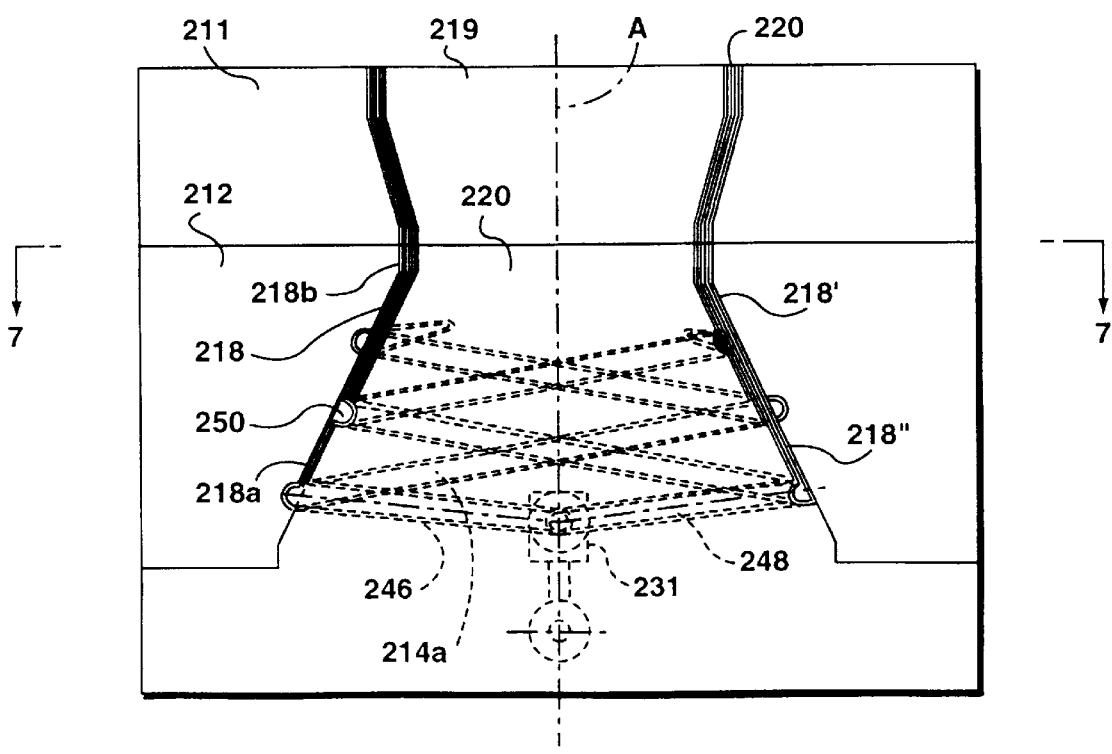
FIG. 6 is a similar view of another embodiment.

FIGS. 6 and 7 show another embodiment of the invention which is somewhat similar to the embodiment shown in FIGS. 4 and 5. Therefore, the same reference numerals will be used in FIGS. 6 and 7 to identify parts which are the same or similar to parts shown in FIGS. 4 and 5. It will be noted that, whereas in the embodiment of FIGS. 4 and 5 there are two encapsulating units 230, 232, there is only one encapsulating unit 231 in the embodiment of FIGS. 6 and 7 which supplies both feed passages 246, 248.

Figure 8:
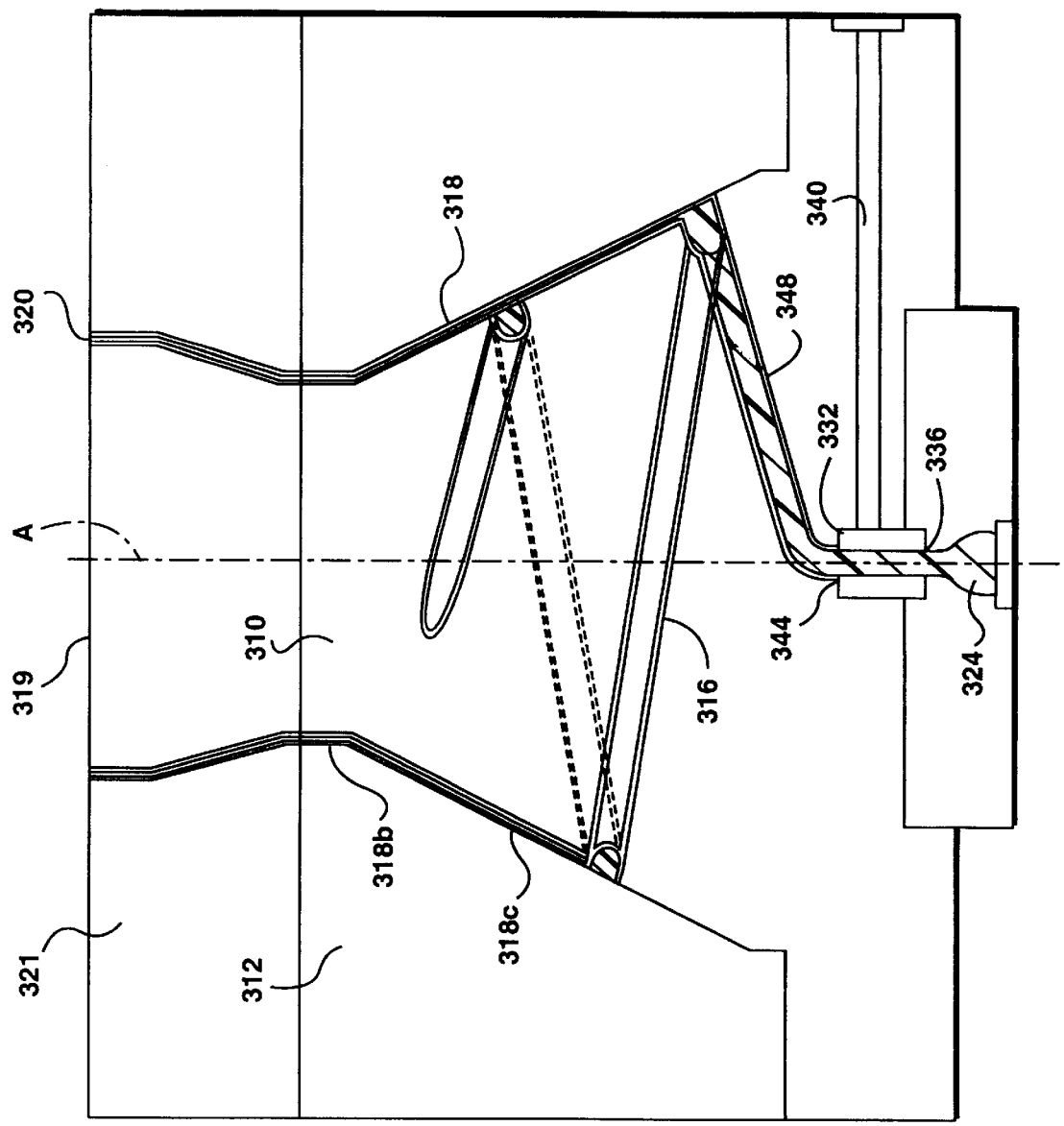
FIG. 8 is a cross-sectional view of another embodiment.

FIG. 8 shows another embodiment of the invention. For ease of understanding, parts of the die shown in FIG. 8 will be given reference numerals which are one hundred higher than the reference numerals given to similar parts of the die shown in FIG. 3.

The die shown in FIG. 8 is similar to the die shown in FIG. 3 except that the inner body member 310 has a single helical groove 316 which extends around the inner body member 310 for just over 360°. The degradable plastic material fed into the die through main feed passage 324 is encapsulated in a circumferentially continuous manner by encapsulating unit 332 which is supplied with non-degradable plastic material through passage 340. The die shown in FIG. 8 thus produces a three layer tubular film.

Figure 9:
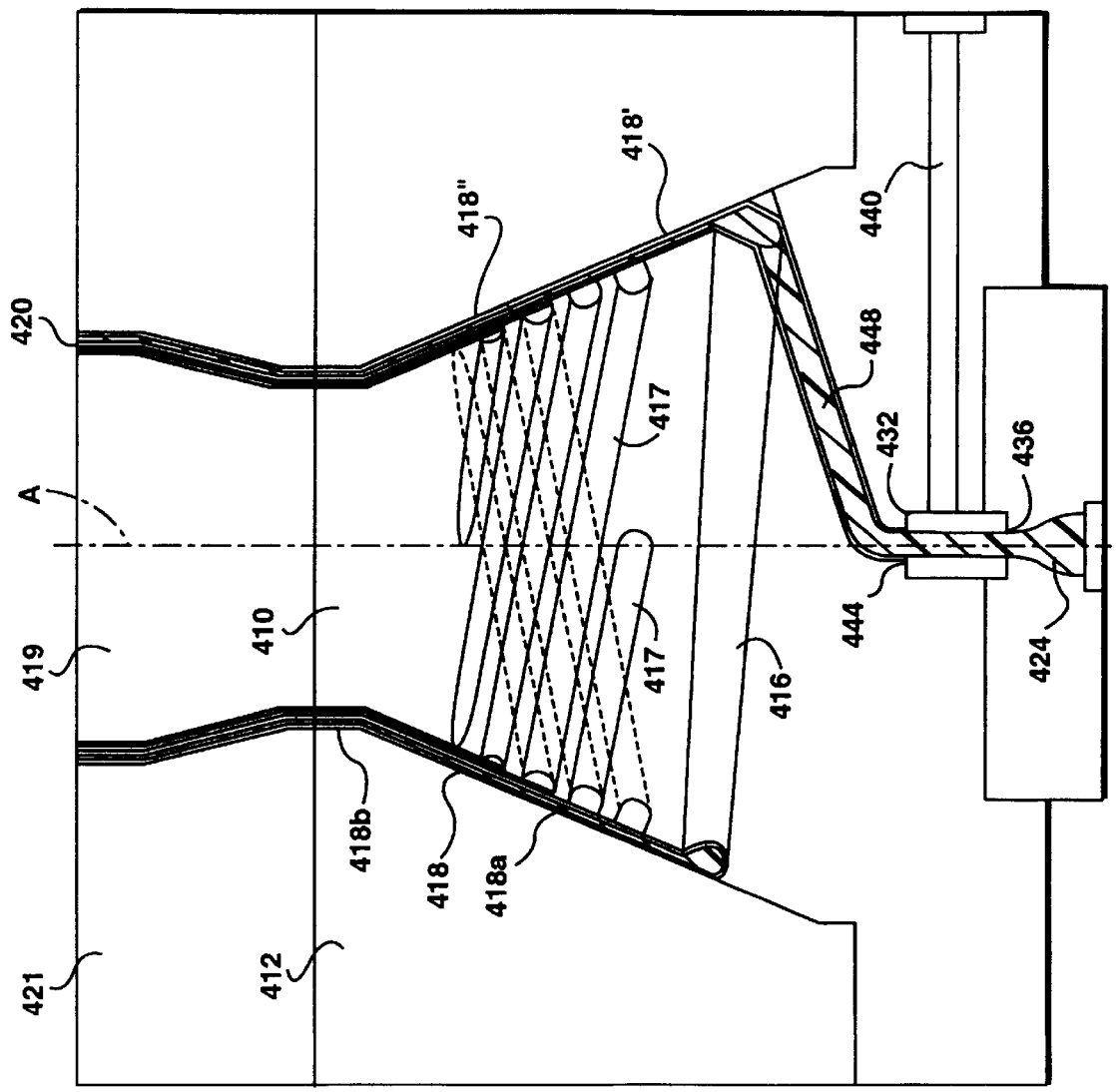
FIG. 9 is a cross-sectional of another embodiment.

FIG. 9 shows another embodiment of the invention. For ease of understanding, parts of the die shown in FIG. 9 will be given reference numerals which are one hundred higher than the reference numerals given to similar parts of the die shown in FIG. 8.

The die shown in FIG. 9 is similar to the die shown in FIG. 8 except that the feed passage 448 feeds encapsulated material to a groove 416 which extends for 360° around the inner body member 410 and feeds encapsulated plastic material to multi-start helical passages 417 in the inner body member 410.

Figure 11:
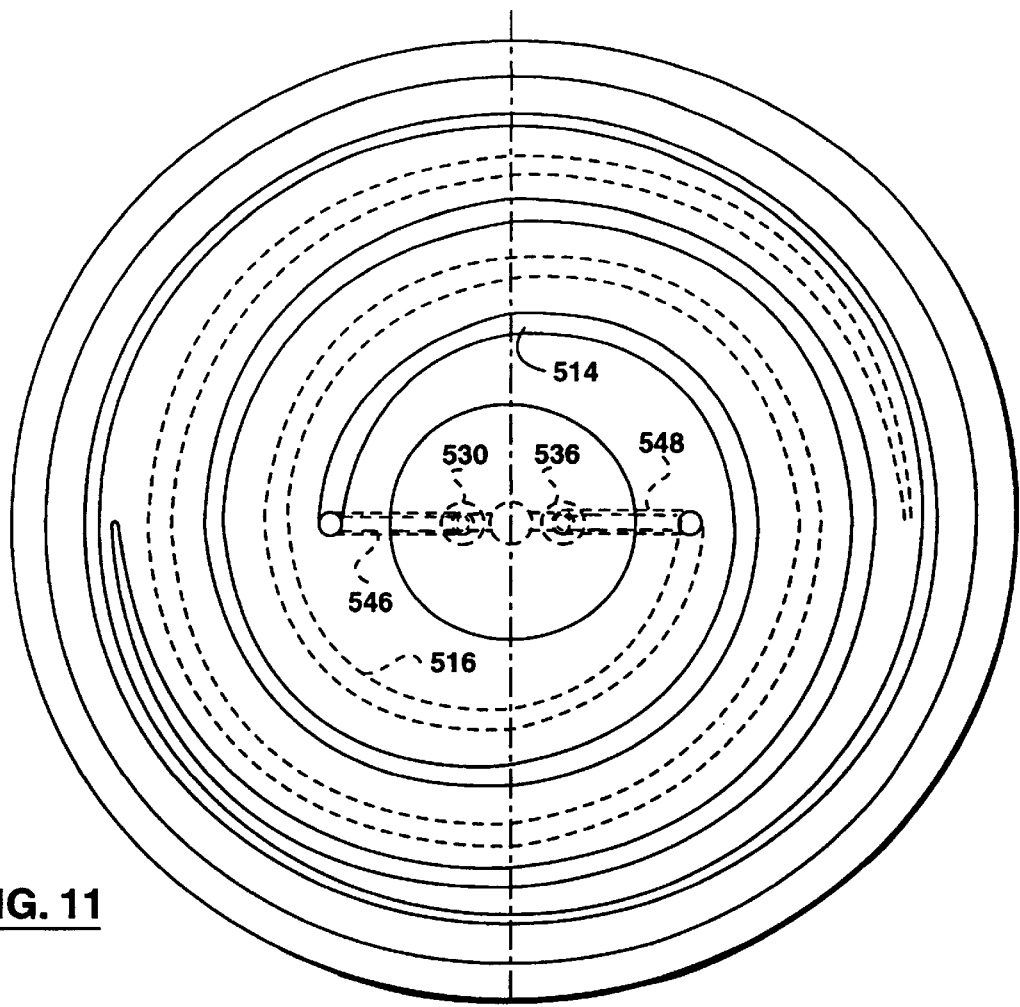
FIG. 11 is a diagrammatic sectional view along the line 11—11 of FIG. 10.
Figure 10:
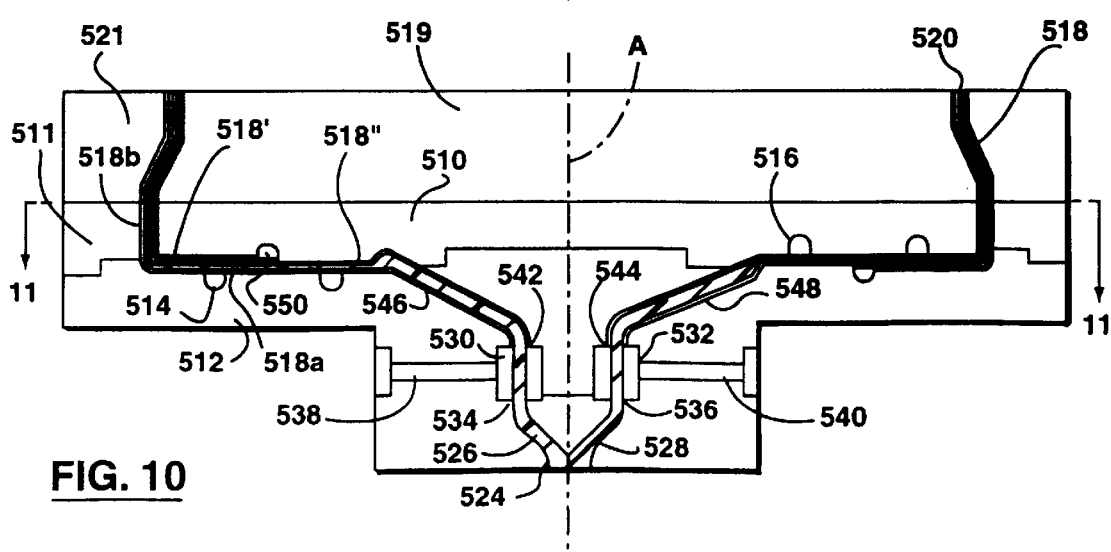
FIG. 10 is a cross-section view of another embodiment.

FIGS. 10 and 11 show another embodiment of the invention. In this embodiment, the die has an inner body member 510 and a first outer body member 512 upon which the inner body member 510 is seated. The inner and outer body members 510, 512 have annular lower and upper surfaces respectively extending perpendicularly to the longitudinal axis A of the die and provided with helical grooves 516, 514 respectively which commence at diametrically opposite positions and extend around the longitudinal axis of the die for 720°. The inner and outer body members 510, 512 form an annular passage 518a with which the grooves 514, 516 are in communication and which extends in a direction perpendicular to the longitudinal axis a of the die. The die also has a second outer body member 511 which surrounds the inner body member 510 and is mounted on the first outer body member 512. The second outer body member 511 and the inner body member 510 form an annular passage 518b therebetween which extends parallel to the longitudinal axis A of the die and which, with annular passage 518a, form an annular passage 518 extending to an annular extrusion orifice 520. The extrusion orifice 520 is formed by inner and outer lip members 519, 521 mounted on top of the inner body member 510 and the second outer body member 511 respectively.

The outer body member 512 has a main feed passage 524 for degradable plastic material extending upwardly from the bottom thereof. Within the outer body member 512, the main feed passage 524 divides into two feed passages 526, 528 respectively. Two encapsulating units 530, 532 are located in the outer and inner body members 512, 510 and have inlets 534, 536 communicating with the feed passages 526, 528 respectively. Each encapsulating unit 530, 532 encapsulated degradable plastic material passing therethrough from the passages 526, 528 respectively in a circumferentially continuous manner with non-degradable plastic material being supplied to the encapsulating units 530, 532 through passages 538, 540 respectively in the outer body member 512.

Each encapsulating unit 530, 532 has an outlet 542, 544 respectively which feeds an encapsulated stream of plastic material, i.e. a stream of degradable plastic material encapsulated in a circumferentially continuous manner with a non-degradable plastic material, to the radially inner ends of the helical grooves 514, 516 respectively through feed passages 546, 548 respectively. At the position 550 at which helical grooves 514, 516 have traversed 180° from their starting positions, the width of the annular passage 518' beyond the portion 550 is somewhat wider than the width of the annular passage 518" before the position 550.

In use, a melt stream of degradable plastic material is passed into the main feed passage 524 and then divided into two streams which pass through passages 526, 528 to the encapsulating units 530, 532 where the divided streams are concurrently encapsulated around their circumferences with non-degradable plastic material. The encapsulated streams then pass through passages 546, 548 into the helical groove 514, 516. The encapsulated material passes into the initial narrow portion 518" of the annular passage 518 to form a three layer film of tubular material, i.e. a tubular film with an inner layer of degradable plastic material and outer layers of non-degradable plastic material. Beyond the 180° position, encapsulated plastic material passes from the helical grooves 514, 516 into the wider portion 518' of the annular passage 518 to form further layers on the inside of the previously formed tubular film. The resultant five layer tubular film is then extruded from the annular die orifice 520.

As shown in FIG. 11, the helical grooves 514, 516 extend around the inner die body members 510, 512 in the same direction for 720°. The resultant tubular film has a central relatively thick layer of non-degradable plastic material, a layer of degradable plastic material on the inner and outer sides thereof, and innermost and outermost layers of non-degradable plastic material. Thus, when the degradable plastic material is vapour barrier material, the tubular film is provided with two vapour barrier layers. The presence of two vapour barrier layers minimizes the possibility of irregularities or pin holes in the barrier layers causing a problem because irregularities or pin holes in one barrier layer are unlikely to be radially aligned with irregularities or pin holes in the other barrier layer. Further, in this case, each vapour barrier layer can be relatively thin, for example less than ten microns, to reduce the possibility of the barrier layer cracking, as happens with some plastic materials (for example highly crystalline plastic material) when the barrier layer is thicker. Also, when the degradable plastic material is relatively rigid and the non-degradable plastic material is relatively elastic, the alternating layers of rigid and elastic plastic material provide a tubular film of high impact strength.

It will be understood that the helical grooves 514, 516 may extend around the inner die body member 510 in the same direction for just over 180° so as to form a three layer tubular film. Alternatively, the helical grooves 514, 516 may extend around the inner die body member 110 for just over 540° to produce a seven layer tubular film. Also, the degradable plastic film entering the passage 524 may be circumferentially encapsulated with non-degradable plastic material as primary encapsulation, with the encapsulating units 530, 532 thus providing secondary encapsulation.

Figure 13:
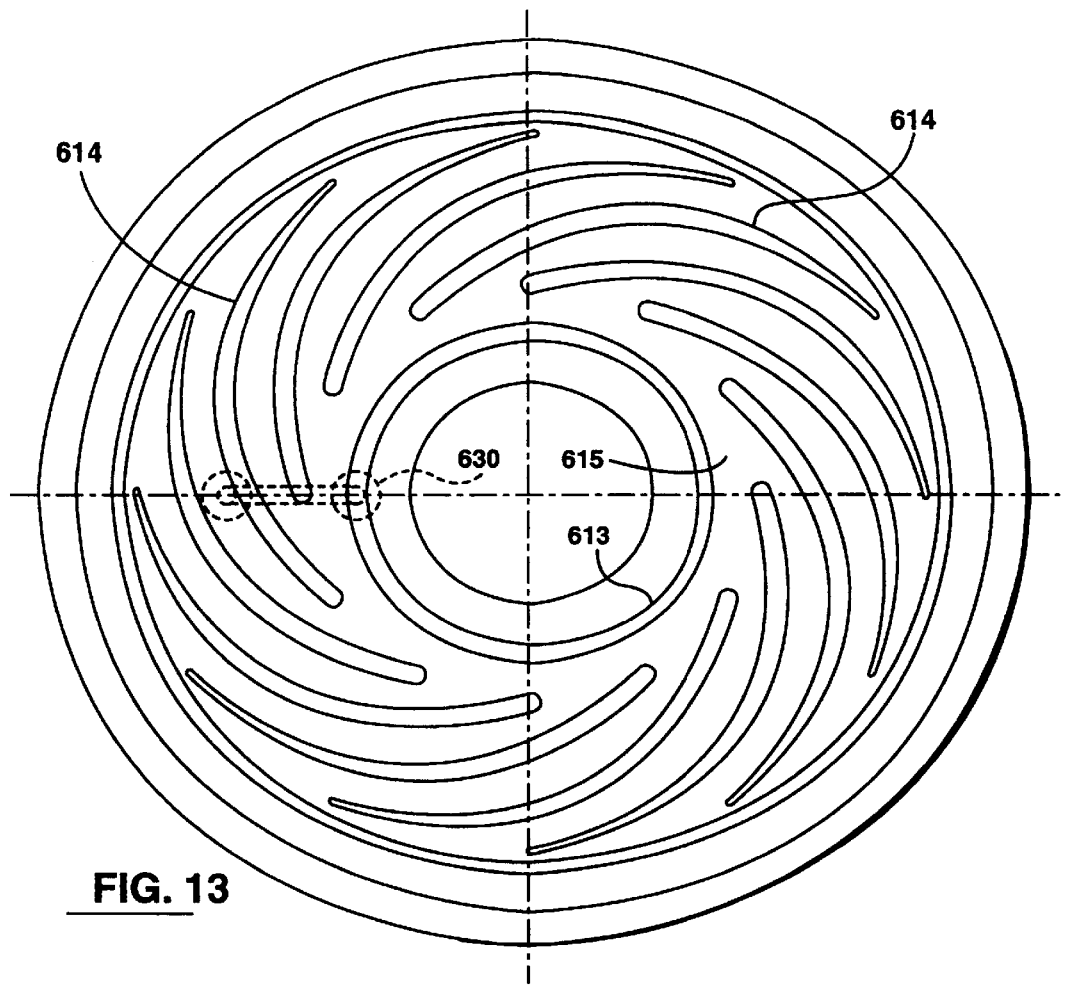
FIG. 13 is a diagrammatic sectional view along the line 13—13 of FIG. 12.
Figure 12:
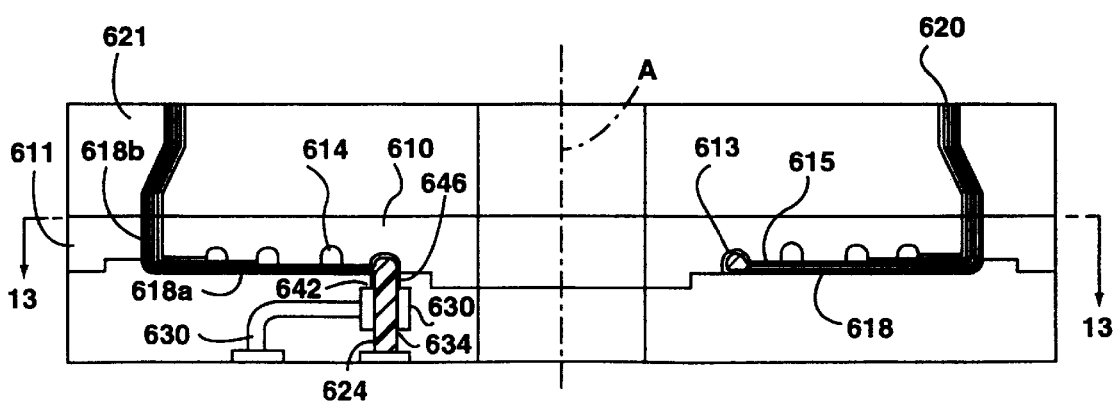
FIG. 12 is a cross-sectional view of another embodiment.

FIGS. 12 and 13 show another embodiment of the invention. For ease of understanding, parts of the die shown in FIGS. 12 and 13 will be given reference numerals which are one hundred higher than the reference numerals given to similar parts of the dies shown in FIGS. 10 and 11.

The die shown in FIGS. 12 and 13 differs from the dies shown in FIGS. 10 and 11 in that the inner body member 610 has a series of helical grooves 614 which each extend 90°. The degradable plastic material is fed into the die through main feed passage 624 and is encapsulated in a circumferentially continuous manner by encapsulating unit 630 which is supplied with non-degradable plastic material through passage 638. The encapsulated material is then fed through feed passage 646 to annular groove 613 in the inner body member 610, and therefrom across a gap 615 to the helical groove 614.

Figure 14:
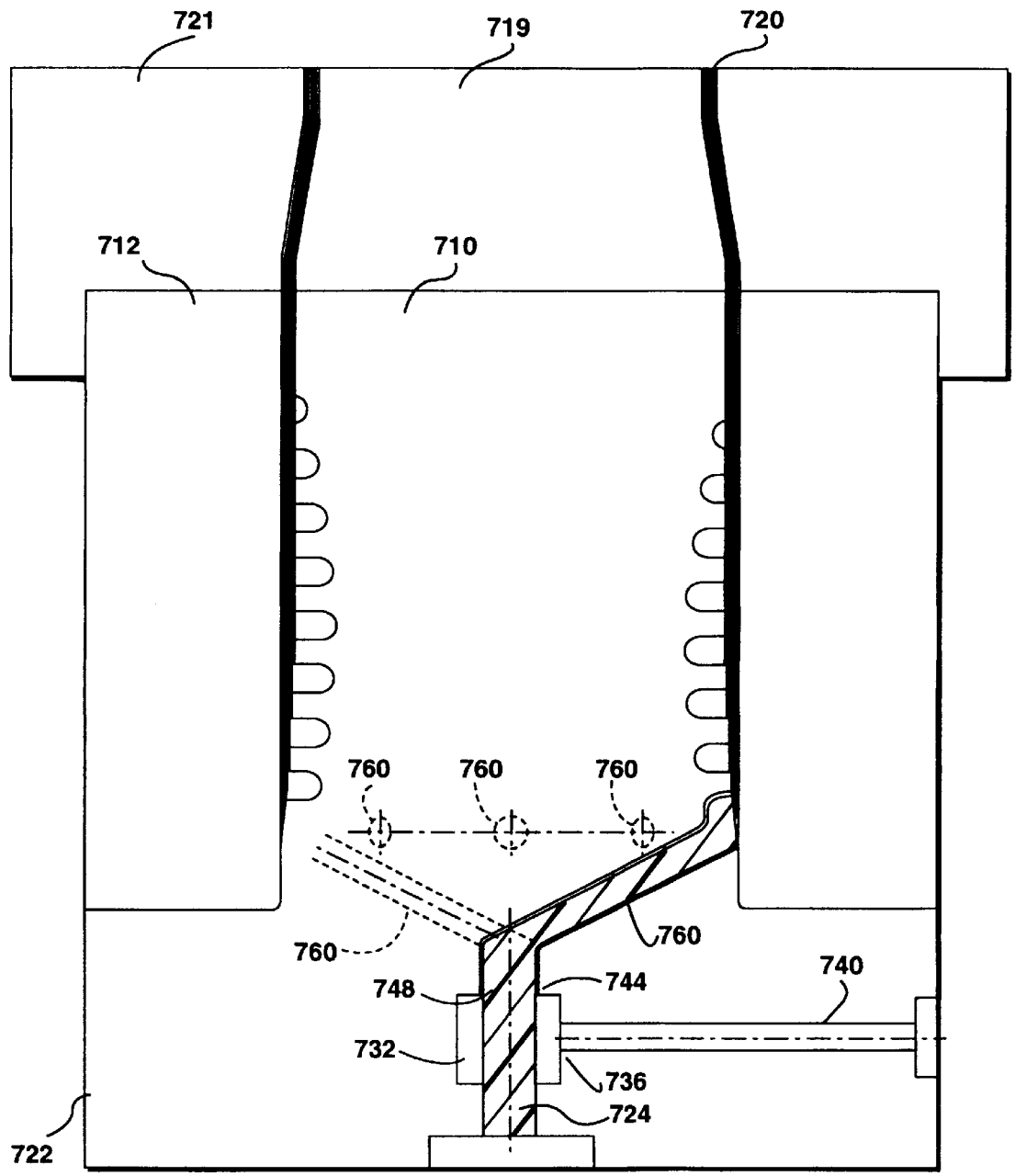
FIG. 14 is a cross-sectional view of another embodiment.
Figure 15:
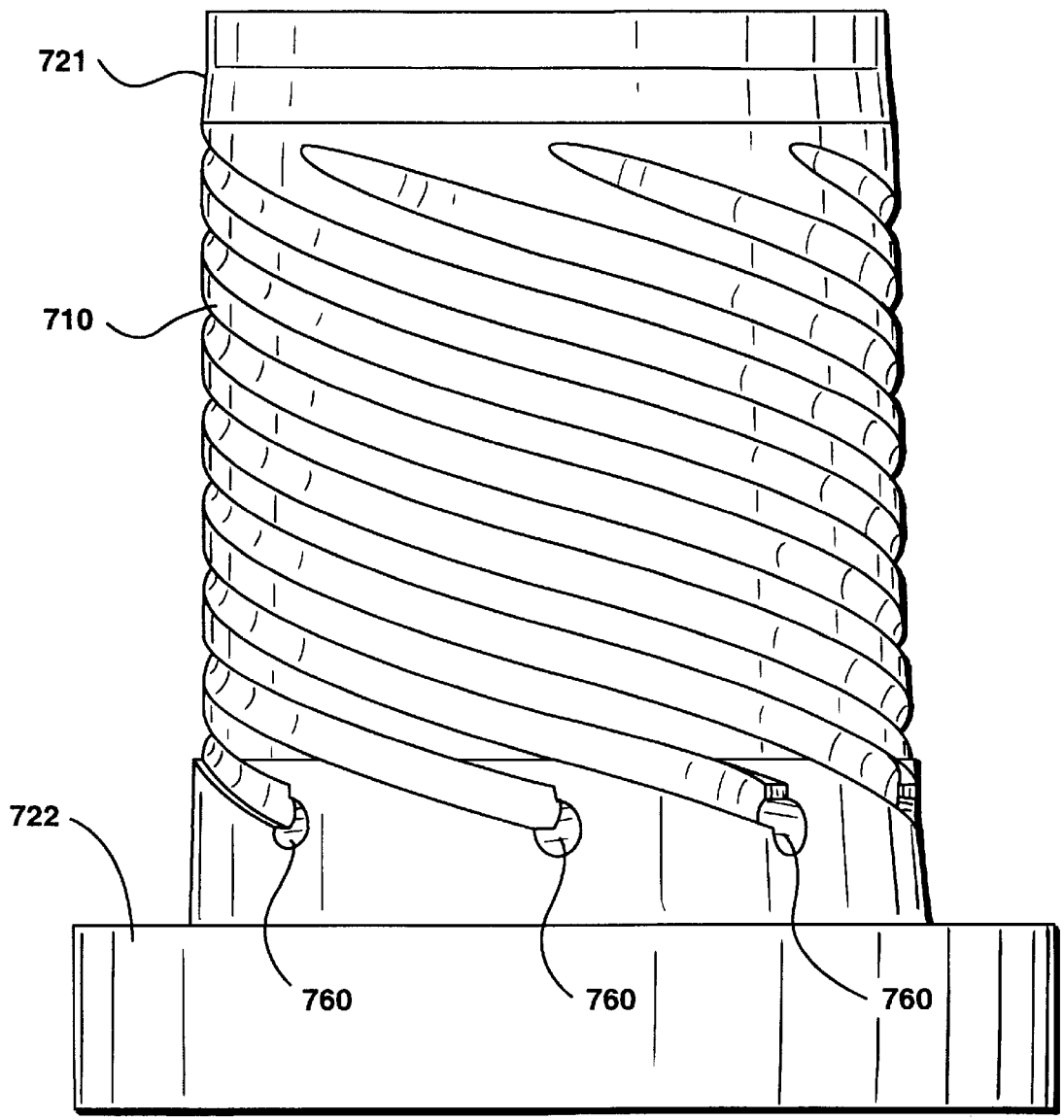
FIG. 15 is a side view of the inner body member and base member of the embodiment shown in FIG. 14.

FIGS. 14 and 15 show another embodiment of the invention. For ease of understanding, parts of the die shown in FIGS. 14 and 15 will be given reference numerals which are seven hundred higher than the reference numerals given to similar parts of the die shown in FIG. 1.

The encapsulated plastic material 748 leaving the encapsulating unit 732 is divided into eight streams which respectively pass through eight equi-angularly spaced radially extending cross-holes 760 in the inner body member 710. Each cross-hole 760 supplies partially encapsulated material to a respective one of eight helical grooves 762 which extend around the inner body member 710 for 350° in an upwardly spiralling direction.

It should be noted that, although the described embodiments have primarily been concerned with the extrusion of degradable plastic material encapsulated with non-degradable plastic material, the invention is not limited to the use of degradable plastic material. The dies described may be used to produce multilayer tubular plastic films with layers of any suitable compatible plastic material.

Other embodiments of the invention will now be readily apparent to a person skilled in the art from the foregoing description of preferred embodiments. The scope of the invention being defined in the appended claims.

What is claimed is:

1. An annular extrusion die for extruding plastic material in multi-layer tubular form, said extrusion die having an inner body member and an outer body member surrounding the inner body member and forming an annular passage therebetween which communicates with an annular extrusion orifice, said body members having at least a pair of helical grooves extending in opposite directions from a common starting location around the inner body member for supplying plastic material to the annular passage for subsequent extrusion in tubular form from the annular extrusion orifice, each helical groove extending for at least 180° around the inner body member, a feed passage for supplying a first plastic material, and a single encapsulating unit for supplying a second plastic material such that the first plastic material is surrounded by the second plastic material which are both supplied to the common starting location to cause a flow of encapsulated plastic material to pass into both helical grooves.

2. An annular extrusion die for extruding plastic material in multi-layer tubular form, said extrusion die having an inner body member and an outer body member surrounding the inner body member and forming an annular passage therebetween which communicates with an annular extrusion orifice, said body members having a series of helical grooves extending around the inner body member and each commencing at a separate location, said separate locations being spaced around a lower portion of the inner body member, a feed passage for supplying a first plastic material, a single encapsulating unit for providing a second plastic material such that the first plastic material is surrounded by the second plastic material which are both supplied to an outlet thereof, said inner body member having a series of cross-holes extending from said encapsulating unit outlet and each communicating with a respective separate location whereby the encapsulating unit supplies encapsulated plastic material through the outlet and the cross-holes to the helical grooves and subsequently to the annular passage for extrusion through the annular extrusion orifice as a multi-layer tubular film.

* * * * *